United States Patent Office 3,280,188
Patented Oct. 18, 1966

3,280,188
TETRACYCLINE COMPLEXES AND THE USE THEREOF IN PREPARING AND ISOLATING TETRACYCLINES
Joao Villax, Travessa do Ferreiro 3, Lisbon, Portugal
No Drawing. Filed Mar. 19, 1964, Ser. No. 353,235
8 Claims. (Cl. 260—559)

The present invention relates to the preparation and isolation of various tetracyclines such as tetracycline, oxytetracycline, chlortetracycline and dimethylchlortetracycline, by means of new alkaline earth metal dibenzylideneethylenediimine complexes of the respective tetracyclines.

In the embodiment of the present invention the new complexes are formed by adding N,N'-dibenzylideneethylenediimine, hereinafter designated by "Δ-DBED" of the formula $$C_6H_5.CH=N-CH_2CH_2-N=CH.C_6H_5$$

to the culture medium during fermentation or to the already fermented broth, in the presence of alkaline earth metal ions, and are precipitated after separation from the mycelium at a pH between 8 and 9.5. The respective tetracycline is then liberated from the complex thus obtained, by adjusting the pH to its isoelectric point by acidification.

The present invention presents important industrial advantages: isolation accomplished in few steps; organic solvents not used; use of cheap isolation products; and high yield.

When Δ-DBED is added to the culture medium during fermentation, the fermentation yield, i.e. the antibiotic activity attained by the medium during fermentation, increases by 5 to 20% approximately, according to the conditions and the strain used, in comparison to parallel fermentations run without addition of Δ-DBED.

The quantity of Δ-DBED added to the broth is. at least, half a mole per mole of antibiotic, in respect of tetracycline, oxytetracycline and chlortetracycline. In the case of demethylchlortetracycline, it is preferable to use one mole and a half of Δ-DBED per mole of the antibiotic.

In order to obtain the highest yields, there are added during fermentation 10 to 1000 milligrams of Δ-DBED per liter of broth in various portions, and to the acidified and filtered broth there is added, at pH 5, the quantity of Δ-DBED necessary to obtain the above-mentioned proportions, calculated on the quantity of antibiotic formed during fermentation. The embodiment of the present process also includes the isolation of the tetracyclines by means of the Δ-DBED complexes, in the event of the same being carried out exclusively in the phase of the already fermented broth.

Any tetracycline-producing microorganism, such as Streptomyces alboflavus, Sterptomyces aureofaciens, Streptomyces flavus, Streptomyces, flaveolus, Streptomyces rimosus, Streptomyces viridifaciens, Streptomyces sayamaensis, Streptomyces psammoticus, Streptomyces lusitanus, Streptomyces varsoviensis, including its mutants, can be used in the present process.

The Δ-DBED is added to the culture medium in various portions under sterile conditions. When the additions are made at 0, 36, 96 and 120 hours of fermentation, satisfactory results are obtained. The fermented broth is then acidified at a pH between 0.5 and 1.8 with an acid, such as sulphuric and oxalic acid, although other acids can also be used. The broth is then filtered and the pH adjusted to 5 with ammonia, in the event it contains alkaline earth metal ions in quantity sufficient to form the Δ-DBED complex, and if not the pH is adjusted with an alkaline earth metal hydroxide. There is then added the quantity of Δ-DBED necessary to obtain a total quantity of, at least, half a mole per mole of the tetracycline, oxytetracycline or chlorotetracycline present, and at least one mole and a half per mole of demethylchlortetracycline. After stirring the addition of the base is continued until pH 8 to 9.5. The Δ-DBED complex is then precipitated.

Analysis confirms that the complexes formed correspond to the following formulas:

$$Tetracycline_8.\Delta\text{-}DBED_3.Me_4$$

$$Oxytetracycline_8.\Delta\text{-}DBED_3.Me_4.16H_2O$$

$$Chlortetracycline_8.\Delta\text{-}DBED_3.Me_6$$

$$Demethylchlortetracycline_2.\Delta\text{-}DBED_3.Me_3$$

where Me is an alkaline earth metal. In addition to the above-mentioned complexes, other less important complexes having a different composition can be prepared and formed.

The complex formed is then filtered off, washed with water and suspended, when still wet, in water. By adjusting the pH of the suspension to the isoelectric point of the respective tetracycline with an acid such as hydrochloric, sulphuric or oxalic acid, the corresponding tetracycline base can be prepared in pure state. By recrystallizing the complexes, using a suitable solvent, such as dimethylformamide, by addition of water, the complexes can be obtained in pure form.

In view of the fact that the broths used usually contain calcium salts in a great amount and the broth acidified by dilute sulphuric acid also contains calcium ions in excess for the precipitation of the complex, the addition of a sequestering agent, such as ethylenediamine tetraacetate, before the precipitation of the complex, makes it possible to obtain higher yields. Also the addition of an antioxidant to the acidified broth makes it possible to obtain a product of a higher degree of purity. As antioxidant, ammonium formaldehyde sulfoxylate is preferred but any other smooth antioxidant can be used.

In each case, the base obtained after precipitation at the pH of the isoelectric point meets the degree of purity required by the various pharmacopeias and can be used for medicinal purposes or can be transformed into the corresponding acid salts by known methods.

The other fermentation conditions are generally known and the following examples give a full illustration of how same is performed.

The Δ-DBED complexes, although used essentially for isolating the respective tetracyclines, can also be used as such for pharmaceutical purposes, having an antibiotic activity "in vitro" and "in vivo" equivalent to the respective tetracycline they contain. They can also be used as feed supplement for animals.

The various Δ-DBED complexes present in pure state the following characteristics:

$\Delta\text{-}DBED_3.Ca_4.tetracycline_8$: decomposition over 200° C.; specific rotation: $[\alpha]_D = -225°$ (c.=1 in N/10 HCl). Ultraviolet spectrum:

$\lambda$ max. 222 ($E_{1cm}^{1\%}$ 292); $\lambda$ max. 255/56 ($E_{1cm}^{1\%}$ 403); $\lambda$ max. 355/357 ($E_{1cm}^{1\%}$ 261)

Infrared spectrum having the following maxima in Nujol: 2.97μ, 6.17μ (shoulder), 6.30μ, 6/72μ, 6.93μ, 7.14μ, 7.57μ, 7.83μ (shoulder), 8.56μ, 9.1μ, 9.48μ, 9.66μ, 10.31μ, 10.55μ, 11.76μ, 12.18μ.

$\Delta\text{-}DBED_3.Ca_4.oxytetracycline_8$: decomposition at 170°–172° C.; specific rotation: $[\alpha]_D = -180°$ (c.=1 in N/10 HCl). Ultraviolet spectrum:

$\lambda$ max. 254 ($E_{1cm}^{1\%}$ 400); $\lambda$ max. 353 ($E_{1cm}^{1\%}$ 231)

Infrared spectrum having the following maxima in Nujol: 3.01μ, 6.12μ (shoulder), 6.22μ (shoulder), 6.32μ, 6.71μ, 6.93μ, 7.17μ, 7.66μ, 7.9μ, 8.07μ, 8.22μ, 8.59μ, 8.94μ, 9.21μ, 9.35μ, 9.52μ, 9.72μ, 9.92μ, 10.35μ, 10.67μ, 11.66μ, 11.95μ, 12.35μ.

Δ-DBED$_3$·Ca$_6$·chlortetracycline$_3$: decomposition beginning at 200° C.; specific rotation: $[\alpha]_D = -230°$ (c.=1 in N/10 HCl). Ultraviolet spectrum:

λ max. 232. ($E^{1\%}_{1cm.}$ 375); λ max. 255 ($E^{1\%}_{1cm.}$ 376); λ max. 370 ($E^{1\%}_{1cm.}$ 178)

Infrared spectrum having the following maxima in Nujol: 2.95μ, 6.12μ (shoulder), 6.26μ, 6.35μ (shoulder), 6.80μ (shoulder), 6.95μ, 7.15μ (shoulder), 7.62μ, 8.17μ (shoulder), 8.30μ, 8.60μ, 8.92μ, 9.57μ, 10.28μ, 12.15μ, 12.37μ.

Δ-DBED$_3$·Ca$_3$·demethylchlortetracycline$_2$: decomposition over 200° C.; specific rotation: $[\alpha]_D = -180°$ (c.=1 in N/10 HCl). Ultraviolet spectrum:

λ max. 232 ($E^{1\%}_{1cm.}$ 503); λ max. 366/368 ($E^{1\%}_{1cm.}$ 171)

Infrared spectrum having the following maxima in Nujol: 3.0μ, 6.13μ, 6.29μ, 6.8μ (shoulder), 6.93μ, 7.22μ, 7.41μ, 7.76μ, 8.07μ, 8.33μ, 8.61μ, 8.86μ, 9.15μ, 9.66μ, 10.0μ, 10.32μ, 11.0μ, 11.45μ, 12.19μ, 13.32μ. Similarly complexes of the same composition may be prepared containing barium, strontium or magnesium instead of calcium, although the preferred complexes are those of calcium.

The following non-limitative examples of presently preferred embodiments serve to illustrate the present invention.

*Example 1*

All media were prepared with tap water.

A fermenter having a useful capacity of 6000 liters, containing a medium of the following composition:

| | Grams per liter of tap water |
|---|---|
| Corn steep liquor | 28 |
| Calcium carbonate | 14 |
| Starch | 38 |
| (NH$_4$)$_2$SO$_4$ | 5.7 |
| NH$_4$Cl | 1.5 |
| MnSO$_4$·4H$_2$O | 0.05 |
| CoCl$_2$·6H$_2$O | 0.002 |
| ZnSO$_4$ | 0.05 |
| Peanut meal | 25 |
| Lard oil | 35 |

(pH 6.7–6.8 after sterilization.)

is inoculated with 150 liters of a pre-culture of *Streptomyces viridifaciens*. There is added to the medium 1 gram/liter of Δ-DBED divided into four equal portions at 0, 36, 72 and 98 hours of fermentation. The fermentation is performed at 28° C. with aeration of 2 liters/liter per minute. After 150 hours, 8.6 grams per liter of tetracycline are obtained. The medium is then acidified to pH 1.5 with 25% sulphuric acid, filtered with a drum filter and the cake is then extracted twice with water at pH 1.5. There is then added to the united filtrate 18 kilograms of ethylenediamine tetraacetate as sequestering agent and 12 kilograms of Δ-DBED; and then the pH is adjusted to 9.5 with 12% ammonia. After 3 hours of agitation, the precipitate which consists essentially of impure Δ-DBED-tetracycline calcium complex having the formula Δ-DBED$_3$·Ca$_4$·tetracycline$_3$, is filtered off. The wet precipitate is then suspended in water, acidified with a 10% aqueous solution of oxalic acid to pH 1.5 under agitation. Then the solution is filtered and the pH is adjusted to 5.8 with a 10% aqueous sodium hydroxide solution. The tetracycline base precipitates. The precipitate is filtered and dried under reduced pressure at 65° C. Effective yield 88% calculated in activity.

*Example 2*

1 liter of sterilized medium having the composition:

| | | |
|---|---|---|
| Corn steep liquor 50% | grams | 10 |
| Sugar | do | 10 |
| CaCO$_3$ | do | 1 |
| (NH$_4$)$_2$HPO$_4$ | do | 2 |
| KH$_2$PO$_4$ | do | 2 |
| MgSO$_4$·7H$_2$O | do | 0.25 |
| Water | milliliters | 1000 | was inoculated with 1 milliliter of spore suspension of *Streptomyces alboflavus* mutant M–108–OX (CBS) and incubated at 25° C. in a rotary shaker for 36 hours. Afterwards, a fermenter containing a sterilized medium of the formula:

| | | |
|---|---|---|
| Tap water | liters | 120 |
| Starch | kilograms | 6 |
| Corn steep liquor (50%) | do | 2.7 |
| CaCO$_3$ | do | 0.72 |
| (NH$_4$)$_2$SO$_4$ | do | 0.8 |
| NH$_4$Cl | do | 0.2 |
| CoCl$_2$ | grams | 0.180 |
| CuSO$_4$·5H$_2$O | do | 0.6 |
| ZnSO$_4$·7H$_2$O | do | 6 |
| FeSO$_4$ | do | 0.180 |
| Sunflower oil | kilograms | 0.2 | was inoculated with the above-mentioned pre-culture of 36 hours. 400 milligrams per liter of Δ-DBED divided into four fractions are added at 0, 36, 72 and 96 hours of fermentation.

Submerged fermentation was then performed at 26° C. under stirring and sterile aeration. Fermentation was stopped after 150 hours, showing a final concentration of oxytetracycline of 7.6 grams per liter.

The fermented broth is acidified with sulphuric acid (25%) until pH 1.5, filtered and the mycelium washed with water. The joint filtrate has a volume of 240 liters. There is then added 2 grams per liter of ethylenediamine tetraacetate (sequestering agent). The pH is then adjusted to 6 with ammonium hydroxide (12%), 140 grams of Δ-DBED added and the pH raised to 9.5 with ammonium hydroxide (12%). After stirring for 3 hours, the formed precipitate is filtered and washed until the pH of the washing waters reaches pH 7. The wet precipitate is suspended in water and acidified with oxalic acid (10%) to pH 1.5. The solution is then filtered and the pH adjusted to 5. The pure oxytetracycline base crystallizes. After filtering and washing, the product is dried. Effective yield 87%.

*Example 3*

The procedure is as in Example 2, but inoculation of the medium is with *Streptomyces rimosus*. 142 hours later, the broth contains 6.3 grams per liter. Final yield 89%.

*Example 4*

300 liters of a sterile culture medium of the composition:

| | | |
|---|---|---|
| Corn steep liquor (50%) | grams | 28 |
| CaCO$_3$ | do | 12 |
| Starch | do | 38 |
| NH$_4$Cl | do | 1.5 |
| MnSO$_4$·4H$_2$O | do | 0.05 |
| ZnCl$_2$ | do | 0.02 |
| CoCl$_2$·6H$_2$O | do | 0.005 |
| Peanut meal | do | 25 |
| Lard oil | do | 25 |
| Water | milliliters | 1000 |

(pH 6.7 after sterilization.)

are inoculated with a spore suspension of *Streptomyces lusitanus* 101–A (CBS) and 1200 milligrams per liter of Δ-DBED divided into four fractions are added to the medium at 0, 36, 72 and 96 hours. The fermentation is performed at 27° C., under stirring and sterile aeration, gradually increasing from 1.5 liters per liter per minute to 4.0 liters per liter per minute. After 150 hours the activity in chlortetracycline is 12.4 grams. The broth is then acidified with sulphuric acid (25%) to pH 0.5 and filtered. Then the pH is raised to 5 with ammonium hydroxide (12%) and 600 grams of Δ-DBED, 1.5 grams per liter of ethylenediamine tetraacetate and 0.3 gram per liter of sodium sulfite added to the filtrate. Upon raising the pH to 8.7, the Δ-DBED complex precipitates. After stirring for 2 hours, the precipitate is filtered, washed with water and well drained. The still wet precipitate is added to 12 liters of dimethylformamide and the complex precipitated by adding 36 liters of water, adjusting the pH to 8.5. The precipitate is filtered off, washed with water until the washing water reaches a neutral pH, and the product dried. There is obtained the Δ-DBED-chlortetracycline complex, containing according to analysis, 19.5% of chlortetracycline expressed as anhydrous base, 4.89% calcium, 14.8% Δ-DBED and 1.1% water. The "in vitro" antibiotic activity is 863 micrograms per milligram expressed as chlortetracycline hydrochloride. Effective yield 88.1%.

*Example 5*

300 liters of medium of the formula specified in Example 4 are inoculated with a spore suspension of a demethylchlortetracycline-producing strain of *Streptomyces aureofaciens*. There are added to the medium 100 milligrams per liter at the beginning and 200—200 milligrams per liter of Δ-DBED after 56 and 112 hours of fermentation. After 130 hours of fermentation, 2.8 grams per liter of demethylchlortetracycline are obtained. To the acidified filtrate 170 grams of Δ-DBED are added, and the further procedure is as in Example 4. The final product has a composition of: 52.8% of demethylchlortetracycline as anhydrous base, 38.4% of Δ-DBED, 6.72% of calcium and 2.43% of water and corresponds to the formula: $\text{Demethylchlortetracycline}_2 \cdot \Delta\text{-DBED}_3 \cdot \text{Ca}_3$ in anhydrous state. Yield 79%.

Having thus disclosed the invention what is claimed is:

1. The N,N'-dibenzylideneethylenediimine complex of tetracycline of the composition:

$$\text{Tetracycline}_8 \cdot \Delta\text{-DBED}_3 \cdot \text{Me}_4$$

where Me is an alkaline earth metal ion.

2. The N,N'-dibenzylideneethylenediimine complex of oxytetracycline of the composition:

$$\text{Oxytetracycline}_8 \cdot \Delta\text{-DBED}_3 \cdot \text{Me}_4 \cdot 16\text{H}_2\text{O}$$

where Me is an alkaline earth metal ion.

3. The N,N'-dibenzylideneethylenediimine complex of chlortetracycline of the composition:

$$\text{Chlortetracycline}_8 \cdot \Delta\text{-DBED}_3 \cdot \text{Me}_6$$

where Me is an alkaline earth metal ion.

4. The N,N'-dibenzylideneethylenediimine complex of demethylchlortetracycline of the composition:

$$\text{Demethylchlortetracycline}_2 \cdot \Delta\text{-DBED}_3 \cdot \text{Me}_3$$

where Me is an alkaline earth metal ion.

5. The N,N'-dibenzylideneethylenediimine complex of tetracycline of the composition:

$$\text{Tetracycline}_8 \cdot \Delta\text{-DBED}_3 \cdot \text{Ca}_4$$

6. The N,N'-dibenzylideneethylenediimine complex of oxytetracycline of the composition:

$$\text{Oxytetracycline}_8 \cdot \Delta\text{-DBED}_3 \cdot \text{Ca}_4 \cdot 16\text{H}_2\text{O}$$

7. The N,N'-dibenzylideneethylenediimine complex of chlortetracycline of the composition:

$$\text{Chlortetracycline}_8 \cdot \Delta\text{-DBED}_3 \cdot \text{Ca}_6$$

8. The N,N'-dibenzylideneethylenediimine complex of demethylchlortetracycline of the composition:

$$\text{Demethylchlortetracycline}_2 \cdot \Delta\text{-DBED}_3 \cdot \text{Ca}_3$$

References Cited by the Examiner

UNITED STATES PATENTS

| | | | |
|---|---|---|---|
| 2,734,018 | 2/1956 | Minieri et al. | 195—80 |
| 2,739,924 | 3/1956 | Lein et al. | 195—80 |
| 2,791,609 | 5/1957 | Kaplan | 260—559 |
| 2,915,555 | 12/1959 | Solomons | 260—559 |

ALEX MAZEL, *Primary Examiner.*

HENRY R. JILES, *Examiner.*

JAMES W. ADAMS, JR., *Assistant Examiner.*